United States Patent [19]

Turner et al.

[11] 4,425,455

[45] Jan. 10, 1984

[54] DRILLING FLUIDS BASED ON POWDERED SULFONATED THERMOPLASTIC POLYMERS

[75] Inventors: S. Richard Turner; Robert D. Lundberg, both of Bridgewater, N.J.; Thad O. Walker, Humble, Tex.; Dennis G. Peiffer, East Brunswick, N.J.

[73] Assignee: Exxon Research and Engineering Co., Florham Park, N.J.

[21] Appl. No.: 416,945

[22] Filed: Sep. 13, 1982

[51] Int. Cl.$^3$ .......................... C08K 5/01; C08K 3/30; C09K 7/02

[52] U.S. Cl. ................................. 524/158; 524/159; 524/161; 524/400; 524/423; 524/475; 524/547; 252/8.5 C; 252/8.5 A

[58] Field of Search ............... 524/161, 158, 159, 400, 524/423, 475, 547; 252/8.5 C, 8.5 A

[56] References Cited

U.S. PATENT DOCUMENTS 4,085,168  4/1978  Milkovich et al. ................. 523/106
4,293,427  10/1981  Lucas et al. ..................... 252/8.5 A

OTHER PUBLICATIONS

Chem. Abst. 94-105974q (1981) Chesser et al., "High--Temp. Stabilization of Drilling Fluids with a Low MWT Copolymer".

*Primary Examiner*—Melvyn I. Marquis
*Assistant Examiner*—Herbert J. Lilling
*Attorney, Agent, or Firm*—Richard E. Nanfeldt

[57] ABSTRACT

The present invention relates to powdered sulfonated thermoplastic polymers which function as viscosification agents when added to oil-based drilling muds which are the fluids used to maintain pressure, cool drill bits and lift cuttings from the holes in the drilling operation for oil and gas wells. The powdered sulfonated thermoplastic polymer has about 5 to about 100 meq. of sulfonate groups per 100 grams of the sulfonated thermoplastic polymer, wherein the sulfonated groups are neutralized with a metallic cation or an amine or ammonium counterion. The powdered sulfonated thermoplastic polymers have a particle size range of 0.25 μm to 2.5 μm and are prepared by spray drying an emulsion of the sulfonated thermoplastic polymer which has been prepared by a free radical copolymerization process. A polar cosolvent can optionally be added to the mixture of oil drilling mud and sulfonated polymer, wherein the polar cosolvent increases the solubility of the sulfonated polymer in the oil drilling mud by decreasing the strong ionic interactions between the sulfonate groups of the sulfonated polymer.

14 Claims, No Drawings

DRILLING FLUIDS BASED ON POWDERED SULFONATED THERMOPLASTIC POLYMERS

FIELD OF THE INVENTION

The present invention relates to powdered sulfonated thermoplastic polymers which function as viscosification agents when added to oil-based drilling muds which are the fluids used to maintain pressure, cool drill bits and lift cuttings from the holes in the drilling operation for oil and gas wells. The powdered sulfonated thermoplastic polymer has about 5 to about 100 meq. of sulfonate groups per 100 grams of the sulfonated thermoplastic polymer, wherein the sulfonated groups are neutralized with a metallic cation or an amine or ammonium counterion. The powdered sulfonated thermoplastic polymers have a particle size range of 0.25 to 2.5 $\mu$m and are prepared by spray drying an emulsion of the sulfonated thermoplastic polymer which has been prepared by a free radical copolymerization process. A polar cosolvent can optionally be added to the mixture of oil drilling mud and sulfonated polymer, wherein the polar cosolvent increases the solubility of the sulfonated polymer in the oil drilling mud by decreasing the strong ionic interactions between the sulfonate groups of the sulfonated polymer.

The drilling muds formed from these powdered sulfonated thermoplastic polymers, by a spray drying means, exhibit improved low temperature rheological properties as compared to drilling muds formed from sulfonated thermoplastic polymers by conventional solvent evaporation or emulsion coagulation, which result in a particle size range of 25 to 250 $\mu$m.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or, amine-treated clays (also as viscosification agent).

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application has heretofore not been particularly successful in that the resulting viscosification agents must maintain adequate viscosities under the drilling conditions which can involve high temperature and high shear conditions.

There has been a substantial need for a drilling fluid which would exhibit good performance at high temperature in water sensitive formation. Past experience has shown that oil-based drilling fluids can provide good performance in water sensitive formations, and the state of the art systems can perform well up to about 350° F. Typically, in such formations, the failure of the viscosities in current muds is circumvented by the addition of more viscosifier during the circulation of the drilling mud. While this solution is adequate at moderate temperatures, when much higher temperatures are encountered (example: geothermal wells or natural gas wells) the degradation of the viscosifier can be so rapid that the additional costs for a viscosifier can be uneconomical. There is a need, therefore, for drilling fluids which can maintain their viscosity and gel strength to temperatures up to and exceeding 400° F. These needs are not adequately met by the current drilling fluids, even with the oil-based drilling muds often employed.

This invention describes an approach to viscosification of oil-based drilling muds which permits the substitution of powdered sulfonated thermoplastic polymers having a particle size range of about 0.25 to 25 $\mu$m for asbestos fines and amine clays. The resulting polymer-modified drilling muds display improved low temperature rheological properties which include improved gel strength at up to temperatures of 300° F. and higher, based on tests conducted for 16 hours at such temperatures.

The types of sulfonated thermoplastic polymers that are envisioned in the present invention include copolymers of sodium styrene sulfonate monomer with styrene vinyl toluene or t-butyl styrene monomer. These polymers possess suitable solubilities in the drilling mud environment.

In U.S. Ser. No. 292,233 Aug. 12, 1981, a high temperature drilling mud was formulated by the incorporation of a powdered sulfonated polystyrene directly into the drilling mud. The instant application differs from U.S. Ser. No. 292,233 filed Aug. 12, 1981 in that the powdered sulfonated polystyrene of the instant invention has a particle size of about 0.25 to 2.5 $\mu$m, whereas the powdered polystyrene of U.S. Ser. No. 292,233, has a particle size of about 25 to 250 $\mu$m and is used to formulate the drilling mud. Quite unexpectedly, the use of a sulfonated polystyrene having a substantially reduced particle size range in forming the drilling mud, results in a drilling mud having improved temperature rheological properties.

The instant invention will describe materials that provide improved and excellent gel strength at temperatures up to 400° F. and may be effective at even higher temperatures.

The preferred species of the instant invention is a free-flowing, non-agglomerating powder of lightly sulfonated polystyrene having a particle size range of about 0.25 to 2.5 $\mu$m with a sulfonate level of about 5 to about 100 meq. of sulfonate groups per 100 grams of sulfonated polymer. It is believed that this polymer is not soluble in either the hydrocarbon phase or the aqueous phase of a formulated mud and; therefore, the polymer is probably located at the interface. As a consequence, this polymer is an extremely effective viscosifier even at quite low levels.

A second facet of the instant invention relates to the use of these materials in formulations which employ high concentrations of salt in the aqueous phase. The powdered sulfonated polystyrenes (SPS) which are the preferred embodiment of this invention, lose some of their efficacy in salt water. It has been found that the combination of a suitable non-ionic emulsifier with the latex of the SPS gives formulations which are effective with salt water. Therefore, these systems give formulations which perform well at temperatures up to 300° F. and in the presence of salt water phases, which is a highly desired objective in the drilling fluids industry.

SUMMARY OF THE INVENTION

The present invention relates to powdered sulfonated thermoplastic polymers having a particle size of about 0.25 to 2.5 μm which function as viscosification agents when added to oil-based drilling muds which are the fluids used to maintain pressure, cool drill bits and lift cuttings from the holes in the drilling operation for oil and gas wells. The sulfonated thermoplastic polymer of the latex has about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated polymer, wherein the polar cosolvent increases the solubility of the sulfonated polymer in the oil drilling mud by decreasing the strong ionic interactions between the sulfonate groups of the sulfonated polymer.

The drilling muds formed from the powdered sulfonated thermoplastic polymers having a particle size range of about 0.25 to 2.5 μm exhibit improved rheological properties up to 300° F., as compared to drilling muds formed from powders of sulfonated thermoplastic polymers having a particle size range of 25 to 250 μm.

GENERAL DESCRIPTION OF THE INVENTION

The present invention describes viscosification agents for oil-based drilling muds which are used during the operation of gas and oil wells, wherein these viscosification agents are powdered free-flowing nonagglomerating sulfonated thermoplastic polymers having a particle size range of about 0.25 to 2.5 μm. The oil-based drilling muds of the instant invention minimally comprise, but can also include other additives; an organic liquid such as an oil, fresh water or salt water, an emulsifier, a wetting agent, a weighting material and a latex of sulfonated polymer. In general, the oil-based drilling mud has a specific gravity of about 7 pounds per gallon to about 20 pounds per gallon, more preferably about 10 to about 16, and most preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 20 to about 50 lb/bbl. of an emulsifier and/or supplementary emulsifier; about ½ to about 5 lb/bbl. of a wetting agent; and weighting material (barium sulfate or barite) necessary to give the desired mud density; which comprises less than about 800 lb/bbl. of barium sulfate, more preferably about 5 to about 750, and most preferably about 10 to about 700; and about 0.25 to about 4 lb/bbl. of a powdered sulfonated thermopolymer.

The oil employed in the oil-based drilling mud is generally a No. 2 diesel fuel, but it can be other commercially available hydrocarbon solvents such as kerosene, fuel oils, or selected crude. If crudes are used, they should be weathered and must be free of emulsion breakers.

Typical, but non-limiting examples of suitable emulsifiers which can be readily employed are magnesium or calcium soaps of fatty acids.

Typical, but non-limiting examples of a suitable wetting agent which can be readily employed is an alkylaryl sulfonate.

Typical, but non-limiting examples of a weighting material which can be readily employed is barite or a barium sulfate, which may optionally be surface-treated with other cations such as calcium.

The powdered neutralized sulfonate-containing polymers are formed by a free radical copolymerization process. The monomer used in the free radical emulsion copolymerization process is styrene monomer, which is copolymerized with sulfonate-containing styrene monomer.

In general, the styrene and sulfonate-containing styrene monomer are dispersed in a water phase in the presence of a free radical initiator and a suitable surfactant, wherein the temperature is sufficient to initiate polymerization. The resultant latex is injected in a Buchi Laboratory Spray Dryer.

The resultant powdered sulfonated thermoplastic formed by this spray drying process has a particle size range of about 0.1 to about 10 μm, more preferably about 0.15 to about 5 μm, and most preferably about 0.25 to about 2.5 μm. To the drilling mud formulation is added about 0.25 to about 4 lb/bbl. of the powdered sulfonated thermoplastic polymer.

The sulfonate-containing polymers formed from the free radical emulsion copolymerization and spray drying process of the instant invention can be generally described as having an $M_n$ of about 5,000 to about 200,000, more preferably about 10,000 to about 100,000. The sulfonate-containing polymers of the instant invention contain about 18 to about 100 meq. of sulfonate groups per 100 grams of polymer, more preferably about 18 to about 90, and most preferably about 20 to about 80. The preferred sulfonate-containing polymer which is formed by the instant, free radical emulsion copolymerization and spray drying process is styrene/sodium styrene sulfonate copolymer, which can optionally have up to 3 wt. % sodium styrene sulfonate monomer therein.

The sulfonate-containing monomers of the instant invention, which are water soluble, can be generally described as a monomer having unsaturation and a metal or amine sulfonate group. The metal or amine neutralized sulfonate monomer is characterized by the formula:

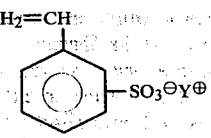

wherein $Y^\oplus$ is a cation selected from Groups IA, IIA, IB and IIB of the Periodic Table or an amine of the formula:

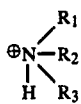

where $R_1$, $R_2$ and $R_3$ can be aliphatic groups of $C_1$ to $C_{12}$ or hydrogen. Particularly suitable metal cations are sodium, potassium and zinc, and an especially preferred metal cation is sodium. A typical, but non-limiting example of suitable sulfonate-containing monomer is:

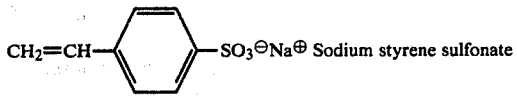

An especially preferred sulfonate-containing monomer is metal styrene sulfonate. The molar ratio of sulfonate-containing monomer to styrene monomer is about 1/200 to about 1/5, more preferably about 1/150 to about 1/6 and most preferably about 1/100 to about 1/9.

The redox emulsion polymerization recipe used in this invention is effective in initiating the copolymerization of water insoluble and water soluble comonomers in an emulsion system.

In general, the styrene and sulfonate-containing comonomer are dispersed in a water phase in the presence of a water soluble initiator or a redox system which is water soluble or has one component soluble in the oil phase and one component soluble in the water phase, and either with or without surfactant, wherein the temperature is sufficient to initiate polymerization.

The surfactants employed for this invention are varied and well-known in the art. The typical emulsifiers or surfactants can be employed; however, some are more effective than others in generating latices of better stability. A preferred emulsifier is sodium lauryl sulfate.

The buffering agents, if used, in the instant polymerization process are selected from the group consisting of sodium carbonate, ammonia, sodium acetate, trisodium phosphate, etc. These buffering agents are employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is from 0 to about 1.0 grams per 100 grams of the combined weight of the sulfonate-containing monomer and the conjugated diene.

The free radical emulsion copolymerization of the water soluble sulfonate-containing polymer and the styrene monomer yields a stable latex, wherein the resultant water insoluble sulfonate-containing copolymer is not covalently cross-linked and possesses substantial ionic cross-linking, and has about 18 to about 100 meq. of sulfonate groups per 100 grams of polymer, more preferably about 18 to about 90.

DETAILED DESCRIPTION OF THE PREFERRED EMBODIMENTS

EXAMPLE 1

The powdered sulfonated thermoplastics which were used in the drilling mud formulations were prepared by emulsion techniques that allow incorporation of sodium sulfonate styrene monomer into styrene to form the sulfonate-containing copolymer. A glass pressure bottle was charged with 50 ml. of deaerated water, 25.0 g. of styrene, 1.0 g. of NaSS, 1.6 g. of sodium lauryl sulfate, 0.1 g. of potassium persulfate and 0.1 g. of dodecyl thiol as a chain transfer agent to control molecular weight. The bottle was flushed with nitrogen, capped and then was shaken at 50° C. in a thermostatted water bath for six hours. The resulting stable emulsion was short stopped with hydroquinone and cooled to room temperature. This emulsion was sprayed dried into a powder which was used in the drilling fluid formulation. This represents polymer B in Table I.

EXAMPLE 2

Styrene and sodium styrene sulfonate were copolymerized in an identical fashion to Example I. Note: The resulting emulsion was coagulated by addition to excess methanol and sodium chloride. The resulting solid polymer was isolated by filtration and dried under vacuum. This copolymer is Polymer A in Table I.

EXAMPLE 3

The mud formulation was prepared by mixing 205.82 g. of No. 2 diesel oil, 34.7 g. Oil Faze (Magcobar), 1.5 g. SE11 and 1.5 g. DV33 (Magcobar). To this mixture, 10.0 g. of $CaCl_2$ in 21 ml. of $H_2O$ was added. Four batches of this mud formulation were prepared and Polymer A was added at treat levels of ½ lb/bbl., and Polymer B to the other at the same treat rate. The results are displayed in Table I. Note the superior 600 rpm and 300 rpm viscosities, the improved yield points and 10 min. gel strength of Polymer B, the spray-dried polymer from Example II.

TABLE I

| SPS[1] Coagulated Polymer vs. SPS Spray Dried Polymer Performance in Oil-Based Drilling Mud | | | | | |
|---|---|---|---|---|---|
| | | Polymer A[2] | | Polymer B[3] | |
| | | ½ lb/bbl. | 1 lb/bbl. | ½ lb/bbl. | 1 lb/bbl. |
| 150° F. | 600 | 34 | 35 | 39 | 40 |
| | 300 | 17 | 17 | 21 | 21 |
| | PV | 17 | 18 | 18 | 19 |
| | YP | 0 | 0 | 3 | 2 |
| | 0 gel | 2 | 3 | 2 | 2 |
| | 10 gel | 2 | 3 | 4 | 4 |
| 300° F. | 600 | 35 | 37 | 43 | 47 |
| | 300 | 17 | 18 | 23 | 25 |
| | PV | 18 | 19 | 20 | 22 |
| | YP | 0 | 0 | 3 | 3 |
| | 0 gel | 2 | 2 | 2 | 2 |
| | 10 gel | 3 | 3 | 10 | 9 |
| 400° F. | 600 | 40 | 43 | 42 | 47 |
| | 300 | 21 | 23 | 22 | 25 |
| | PV | 19 | 20 | 20 | 22 |
| | YP | 2 | 3 | 2 | 3 |
| | 0 gel | 1 | 3 | 2 | 3 |
| | 10 | 4 | 9 | 11 | 12 |

[1]1.99 mol. % NaSS.
[2]Coagulated polymer.
[3]Spray dried polymer.

What is claimed is:
1. An oil-based drilling mud which comprises:

(a) an organic liquid substantially immiscible in water;
(b) about 1 to about 10 parts by weight of water per 100 parts by weight of the organic liquid;
(c) about 20 to about 50 lb/bbl. of an emulsifier and/or emulsifier package;
(d) weighting material necessary to achieve the desired density; and
(e) about 0.25 to about 4 lb/bbl. of a powdered sulfonate-containing styrene polymer having a particle size range of about 0.1 to 10.0 μm, said powdered sulfonate-containing polymer having about 5 to about 100 meq. of sulfonate groups per 100 grams of the neutralized sulfonate-containing styrene polymer.

2. A drilling mud according to claim 1, wherein the sulfonate groups of said neutralized sulfonate-containing styrene polymer are neutralized with a counterion selected from the group consisting of antimony, iron, aluminum, lead and Groups IA, IIA, IB and IIB of the Periodic Table of Elements.

3. A drilling mud according to claim 1 wherein the sulfonate groups of said neutralized sulfonate-containing styrene polymer are neutralized with sodium counterions.

4. A drilling mud according to claim 1 wherein said neutralized sulfonate-containing styrene polymer is of sodium sulfonate styrene monomer and styrene monomer.

5. A drilling mud according to claim 1 further including an alkylaryl sulfonate.

6. A drilling mud according to claim 1 wherein said weighting material is barite or barium sulfate.

7. A drilling mud according to claim 1 wherein the concentration level of said weighting material is sufficient to give said drilling mud a specific gravity of about 7 to about 20 lb/gal.

8. A drilling mud according to claim 1 wherein said organic liquid is an oil.

9. A drilling mud according to claim 1 wherein said organic liquid is a hydrocarbon solvent.

10. A drilling mud according to claim 1 wherein said emulsifier is a magnesium or calcium soap of a fatty acid.

11. A drilling mud according to claim 1 which further includes a polar cosolvent.

12. A drilling mud according to claim 1 wherein said water is salt water.

13. A drilling mud according to claim 1 wherein the concentration of said water is about 3 to about 5 parts by weight per 100 parts by weight of said organic liquid.

14. A drilling mud according to claim 1 wherein said organic liquid is a diesel oil.

* * * * *